(12) United States Patent
Greiner et al.

(10) Patent No.: US 8,173,250 B2
(45) Date of Patent: May 8, 2012

(54) METAL/PLASTIC HYBRID AND SHAPED BODY PRODUCED THEREFROM

(75) Inventors: Robert Greiner, Baiersdorf (DE); Heinrich Kapitza, Furth (DE); Manfred Ochsenkuhn, Berg (DE)

(73) Assignee: Siemens Aktiengesellschaft, Munich (DE)

( * ) Notice: Subject to any disclaimer, the term of this patent is extended or adjusted under 35 U.S.C. 154(b) by 463 days.

(21) Appl. No.: 10/582,215

(22) PCT Filed: Dec. 9, 2004

(86) PCT No.: PCT/EP2004/053381
§ 371 (c)(1),
(2), (4) Date: Jun. 8, 2006

(87) PCT Pub. No.: WO2005/057590
PCT Pub. Date: Jun. 23, 2005

(65) Prior Publication Data
US 2007/0158617 A1 Jul. 12, 2007

(30) Foreign Application Priority Data
Dec. 12, 2003 (DE) .................................. 103 58 342

(51) Int. Cl.
*B32B 23/18* (2006.01)
(52) U.S. Cl. ................. 428/297.4; 428/220; 252/519.33
(58) Field of Classification Search .................. 428/407; 252/511, 512, 500–503
See application file for complete search history.

(56) References Cited

U.S. PATENT DOCUMENTS

| 4,533,685 | A | | 8/1985 | Hudgin et al. |
| 4,582,661 | A | * | 4/1986 | Ito et al. ......................... 264/277 |
| 4,882,227 | A | | 11/1989 | Iwase et al. |
| 4,960,642 | A | * | 10/1990 | Kosuga et al. ................ 428/407 |
| 5,554,678 | A | | 9/1996 | Katsumata et al. |
| 6,274,070 | B1 | | 8/2001 | Tanigaki et al. |
| 2002/0043398 | A1 | * | 4/2002 | Nakagawa et al. ........... 174/256 |
| 2003/0153223 | A1 | * | 8/2003 | Matsumoto et al. .............. 442/1 |

FOREIGN PATENT DOCUMENTS

| EP | 0 942 436 | | 9/1999 |
| JP | 9-241420 | | 9/1997 |
| JP | 09-241420 | * | 9/1997 |

OTHER PUBLICATIONS

Naval Facilities Engineering Command, "Welding Materials Handbook", (1991). pp. (1-29)-(1-30).*
Hawley's Condensed Chemical Dictionary, "Chemical Properties of Materials", 14$^{th}$ ed, (2002).*
Patent Abstract of Japan Bd. 015, Nr. 355 (E-1109), Sep. 9, 1991 & JP 03 138808 A (Toshiba Chem-Corp), Jun. 13, 1991 Zusammenfassung.

* cited by examiner

*Primary Examiner* — Callie Shosho
*Assistant Examiner* — Prashant J Khatri
(74) *Attorney, Agent, or Firm* — Young & Thompson

(57) ABSTRACT

The invention relates to a metal/plastic hybrid and to a shaped body produced therefrom. By combining metallic additives in plastic, it has been shown for the first time that specific volume resistances of less than $10^{-2}$ $\Omega$cm can be realized while the compounds have, at the same time, a good processability during the injection molding process.

7 Claims, No Drawings

METAL/PLASTIC HYBRID AND SHAPED BODY PRODUCED THEREFROM

This is a 371 National Stage application of International application no. PCT/EP2004/053381, filed Dec. 9, 2004, which claims priority to German application no. 10358342.4 filed Dec. 12, 2003. The entire contents of the above-referenced applications are hereby incorporated by reference in their entirety.

BACKGROUND OF THE INVENTION

The invention relates to a metal/plastic hybrid and also to a shaped body produced therefrom.

An electrical and/or electromagnetic and/or thermal conductivity is required for many applications of plastics in electronics and electrical engineering. There are today a large number of plastic compounds which cover a range of specific volume resistance from $10^{10}$ Ωcm to $10^{-1}$ Ωcm. A few special products, which contain carbon fibers as a filler for example, achieve approx. $2\times10^{-2}$ Ωcm. Carbon black, carbon fibers, metal particles, metal fibers or intrinsically conducting polymers for example are used as electrically conducting fillers. However, no thermoplastic compounds are known thus far which have a specific volume resistance of less than $10^{-2}$ Ωcm and are capable of being processed in an injection molding process, for example.

In order to make an insulator such as plastic conducting, continuous conducting paths are created by way of electrically conductive fillers, in other words the conductive particles are ideally in contact with one another. It is known that the best way of realizing a conducting network in the plastic is to incorporate metal or carbon fibers. In this situation, the longer the fiber, the lower is the proportion by weight of fibers that is required for a particular conductivity. As the fiber length increases though, the processing also becomes more problematic because the viscosity of the compound increases significantly. Thus it is that compounds which are obtainable on the market having a steel fiber length of 10 mm can only be processed in the injection molding process up to a maximum proportion by weight of fibers of approx. 25-30%. When shorter fibers are used, compounds having higher proportions by weight of fibers can still be processed in the injection molding process but this does not result in any lowering of the specific volume resistance when compared with the long fiber. Similar characteristics are exhibited by thermoplastics filled with carbon fibers and metal particles. A further problem consists in the fact that, dependent on different coefficients of expansion, the fiber network in the filled thermoplastics stretches due to the effect of temperature and the conducting paths are interrupted.

Attempts are also made to incorporate only low melting-point metal (fusible alloys) in plastic, but only fill levels of 40-50% by weight are achieved as a result, with a specific volume resistance in the order of magnitude of $10^5$ Ωcm. Higher fill levels are excluded on account of the poor compatibility and the large differences in density between the two components to be mixed.

SUMMARY OF THE INVENTION

The object of the invention is therefore to set down a material, capable of being processed by conventional plastic molding processes (injection molding etc), which has a high electrical and thermal conductivity.

The invention relates to a metal/plastic hybrid which comprises a thermoplastic, a metal compound melting in the range between 100° C. and 400° C. and an electrically conducting and/or metallic filler. The invention also relates to a shaped body produced from a metal/plastic hybrid, whereby the metal/plastic hybrid comprises a thermoplastic, a metal compound melting in the range between 100° C. and 400° C. and an electrically conducting and/or metallic filler.

DETAILED DESCRIPTION OF THE INVENTION

The invention also relates to a shaped body produced from the metal/plastic hybrid.

As a complete surprise, it has proved to be the case that fill levels such as have never previously been present of electrically conducting particles or fibers and/or metal in the thermoplastic can be realized and stably produced as a result of the combination of a low melting-point metal compound with an electrical and/or metallic filler.

All the usual electrically conducting fillers such as fibers and/or particles made of metal, metal alloys, (normal, in other words high melting-point, for example copper, steel etc.) carbon black, carbon fibers, intrinsically conducting polymers (for example acetylene, polythiols) etc. are used as the electrically conductive and/or metallic filler. Commercially available metal fibers (copper fibers, steel fibers etc.) and/or carbon fibers can be used. The length of the fibers preferably lies between 1 mm and 10 mm, the thickness should preferably be <100 μm. Furthermore, the conductive fillers can be in the form of particles, spheres, platelets or flakes etc. for example. The size of the particles in this situation should be <100 μm, preferably <50 μm.

All thermoplastics available on the market which can be selected in accordance with the required characteristic profile can be used as the thermoplastic.

As a thermoplastic, the metal/plastic hybrid (preferably) contains, for example, one of the following polymers: bulk plastics such as a polystyrene (PS) or a polypropylene (PP) etc. and/or an engineering thermoplastic such as polyamide (PA) or polybutylene terephthalate (PBT) etc. or as high-temperature thermoplastics a polyetherimide (PEI), a polyphenylene sulfide (PPS), a partially aromatic polyamide etc. All the usual blends and thermoplastic elastomers can naturally also be used.

A low melting-point metal alloy is understood to be a metallic compound whose melting point or melting range lies between 100° C. and 400° C., preferably between 100° C. and 300° C. For high-temperature thermoplastics, some of which require processing temperatures of >400° C., metal compounds having a melting point/melting range of >300° C. can also be used. Both low melting-point metal alloys having a melting range and also those having a melting point can be used according to the invention. The metallic compound essentially comprises metals, but can have any additions, particularly including non-metallic additions and additives.

One feature of the low melting-point metal alloy having a melting point is an immediate and drastic drop in viscosity to <50 mPa s when the melting point is exceeded. This extremely low, almost water-like viscosity contributes decisively in the compound to the high fluidity at high fill levels of filler. In the case of a low melting-point metal alloy (solder connection) having a melting range, the viscosity drops continuously in the melting range and reaches a value of <50 mPa s only after the melting range has been exceeded. According to the invention, both low melting-point metal compounds having a melting point and also those having a melting range can be used. By preference, low melting-point metal compounds which are free of heavy metal are used, in particular those which are free of lead, in other words quite safe in respect of toxicological considerations. Examples of low melting-point metal compounds used also contain at least tin, zinc or bismuth.

Depending on requirements, the proportions of low melting-point point metal alloy and electrically conductive filler can be varied over a wide range, generally between 1 and >95% by weight, in particular between 10 and 80% by weight and between 20 and 75% by weight.

In order to achieve the greatest conductivity, experience has shown that the proportion of low melting-point metal alloy should lie between 20 and 50% by weight, advantageously between 22 and 48% by weight and in particular preferably between 25 and 45% by weight.

The proportion of conductive filler(s) preferably amounts to between 30 and 70% by weight, in particular preferably between 33 and 68% by weight and in particular preferably between 35 and 65% by weight. The filler can consist of pure fibers and/or particles, and also of mixtures of different fibers and/or particles or of combinations of uniform or mixed fibers and/or uniform or mixed particles. The terms "uniform" and "mixed" can relate both to the material composition and also to the particle shape or size.

The overall proportion of the conductive components (low melting-point metal compound and/or filler) amounts as a rule to $\geq 60\%$ by weight, preferably $\geq 70\%$ by weight, in particular preferably $\geq 80\%$ by weight, whereby up to >95% by weight is achieved. Specific volume resistances $\leq 10^{-3}$ $\Omega$cm are thereby achieved. High thermal conductivities can be equally well achieved. The requirements relating to the conductivities (electrical/thermal) depend on the field of application of the hybrid and can vary within wide limits. The specification of the conductivities is not, however, intended to restrict the invention in any way.

Particularly when copper fibers are used as a conductive filler, in combination with the low melting-point metal alloy this results in a "fusion" of the Cu fibers, which is also maintained in the cooled, solidified state. This has the particular advantage with regard to a subsequent component or shaped body which is subjected to temperature changes that the "contacting of the fiber network" and thus the conductivity are fully maintained.

It should be stressed that these compounds having an overall proportion of conductive components (low melting-point metal compound+filler) of $\geq 80\%$ by weight can still be processed in the injection molding process. This is achieved only by means of the combination of the two conductive components in the thermoplastic.

As a result of the low specific volume resistances the occurrence of heat loss in components is greatly limited, heat loss which moreover in combination with the high thermal conductivity of the compounds, which is preferably over 5 W/mK and up to >10 W/(mK), is dissipated very effectively (the cooling of the electronic components is one of the most pressing problems affecting microelectronics).

The material is advantageously manufactured and processed at a temperature at which both the low melting-point metallic alloy and also the thermoplastic are present in a fusible state. This fusible alloy, comprising an inorganic and an organic component, has an extremely high fusibility with the result that further fillers, in other words particles and/or fibers, can be added in a high proportion by weight without losing the good flow or processing characteristics, in other words without bringing about a large increase in the viscosity.

The compounds can be manufactured both discontinuously on a kneading machine and also continuously on an extruder. The measurement of the specific volume resistance (see Embodiments) was carried out on test bodies having the dimensions 50×6×4 mm, manufactured using the injection molding process.

The shaped bodies manufactured from the hybrid according to the invention are produced by means of the usual plastic shaping processes such as injection molding, extrusion, deep-drawing etc.

EMBODIMENTS

Plastic: Polyamide 6 (PA 6)
    Low melting-point metal alloy: MCP 200 from the company HEK GmbH, Lubeck, Germany, melting point 200° C.
    Additive: copper fibers; length approx. 2 mm,
    thickness approx. 80 μm.
    1.1 Composition of compound as percentage by weight:
    PA 6:MCP 200:Cu fibers=20:20:60

| | |
|---|---|
| Specific volume resistance: | $2.7 \times 10^{-3}$ $\Omega$ cm |
| Specific conductivity: | $3.7 \times 10^{2}$ $1/(\Omega$ cm) |

1.2 Composition of compound as percentage by weight:
    PA 6:MCP 200:Cu fibers=15:25:60

| | |
|---|---|
| Specific volume resistance: | $6.3 \times 10^{-4}$ $\Omega$ cm |
| Specific conductivity: | $1.6 \times 10^{3}$ $1/(\Omega$ cm) |

1.3 Composition of compound as percentage by weight:
    PA 6:MCP 200:Cu fibers=10:35:55

| | |
|---|---|
| Specific volume resistance: | $5.4 \times 10^{-5}$ $\Omega$ cm |
| Specific conductivity: | $1.8 \times 10^{4}$ $1/(\Omega$ cm) |
| Thermal conductivity: | 10.5 W/(mK) |
| Electromagnetic screening attenuation: | >100 dB |

Plastic: Polyamide 6 (PA 6)
    Low melting-point metal alloy: MCP 200, melting point 200° C.
    Additive: steel fibers; length approx. 4 mm,
    thickness approx. 10 μm
    2.1 Composition of compound as percentage by weight:
    PA 6:MCP 200:steel fibers=20:30:50

| | |
|---|---|
| Specific volume resistance: | $1.09 \times 10^{-2}$ $\Omega$ cm |
| Specific conductivity: | $9.2 \times 10^{1}$ $1/(\Omega$ cm) |

Plastic: Polyamide 6 (PA 6)
    Low melting-point metal alloy: MCP 220, melting range 97-300° C.
    Additive: copper fibers; length approx. 2 mm,
    thickness approx. 80 μm
    Composition of compound as percentage by weight:
    PA 6:MCP 220:Cu fibers=10:35:55

| | |
|---|---|
| Specific volume resistance: | $1.09 \times 10^{-4}$ $\Omega$ cm |
| Specific conductivity: | $9.16 \times 10^{3}$ $1/(\Omega$ cm) |

3.1 Plastic: polyamide 6 (PA 6)
  Low melting-point metal alloy: MCP 200 A,
  melting range 197-208° C.
  Additive: copper fibers; length approx. 2 mm,
  thickness approx. 80 μm
  Composition of compound as percentage by weight:
  PA 6:MCP 200 A:Cu fibers=10:30:60

| Specific volume resistance: | $1.4 \times 10^{-4}$ Ω cm |
|---|---|
| Specific conductivity: | $7.1 \times 10^3$ 1/(Ω cm) |

3.2 Plastic: polyamide 6 (PA 6)
  Low melting-point metal alloy: MCP 200 B,
  melting range 197-225° C.
  Additive: copper fibers; length approx. 2 mm,
  thickness approx. 80 μm
  Composition of compound as percentage by weight:
  PA 6:MCP 200 B:Cu fibers=10:30:60

| Specific volume resistance: | $2.6 \times 10^{-4}$ Ω cm |
|---|---|
| Specific conductivity: | $4.7 \times 10^3$ 1/(Ω cm) |

Plastic: Polyamide 6 (PA 6)
  Low melting-point metal alloy: MCP 200,
  melting point 200° C.
  Additive: copper fibers; length approx. 2 mm,
  thickness approx. 80 μm
  Additive: steel fibers; length approx. 4 mm,
  thickness approx. 10 μm
  Composition of compound as percentage by weight:
  PA 6:MCP 200:Cu fibers:steel fibers=15:25:30:30

| Specific volume resistance: | $5.3 \times 10^{-3}$ Ω cm |
|---|---|
| Specific conductivity: | $1.89 \times 10^2$ 1/(Ω cm) |

Plastic: Polyamide 6 (PA 6)
  Low melting-point metal alloy: MCP 200,
  melting point 200° C.
  Additive: copper spheres; Ø approx. 32 μm
  Composition of compound as percentage by weight:
  PA 6:MCP 200:Cu spheres=10:15:75

| Specific volume resistance: | $6.0 \times 10^{-2}$ Ω cm |
|---|---|
| Specific conductivity: | $1.67 \times 10^1$ 1/(Ω cm) |

Plastic: Polyamide 6 (PA 6)
  Low melting-point metal alloy: MCP 200,
  melting point 200° C.
  Additive: copper fibers; length approx. 2 mm,
  thickness approx. 80 μm
  Additive: copper spheres; Ø approx. 32 μm
  Composition of compound as percentage by weight:
  PA 6:MCP 200:Cu fibers:Cu spheres=15:15:60:10

| Specific volume resistance: | $2.89 \times 10^{-3}$ Ω cm |
|---|---|
| Specific conductivity: | $3.46 \times 10^2$ 1/(Ω cm) |

Plastic: Acrylonitrile Butadiene Styrene Copolymer (ABS)
  Low melting-point metal alloy: MCP 200 A,
  melting range 197-208° C.
  Additive: copper fibers; length approx. 2 mm,
  thickness approx. 80 μm
  Composition of compound as percentage by weight:
  ABS:MCP 200:copper fibers=25:35:40

| Specific volume resistance: | $7.4 \times 10^{-3}$ Ω cm |
|---|---|
| Specific conductivity: | $1.4 \times 10^2$ 1/(Ω cm) |

Plastic: Polyphenylene sulfide (PPS)
  Low melting-point metal alloy: MCP 200,
  melting point 200° C.
  Additive: copper fibers; length approx. 2 mm,
  thickness approx. 80 μm
  Composition of compound as percentage by weight:
  PPS:MCP 200:copper fibers=15:35:50

| Specific volume resistance: | $4.3 \times 10^{-5}$ Ω cm |
|---|---|
| Specific conductivity: | $2.3 \times 10^4$ 1/(Ω cm) |

Plastic: Polyamide 66 (PA 66)
  Low melting-point metal alloy: MCP 200,
  melting point 200° C.
  Additive: copper fibers; length approx. 2 mm,
  thickness approx. 80 μm
  Composition of compound as percentage by weight:
  PA 66:MCP 200:copper fibers=20:25:55

| Specific volume resistance: | $1.8 \times 10^{-3}$ Ω cm |
|---|---|
| Specific conductivity: | $5.6 \times 10^2$ 1/(Ω cm) |

Plastic: Polyetherimide (PEI)
  Low melting-point metal alloy: MCP 220,
  melting range 97-300° C.
  Additive: copper fibers; length approx. 2 mm,
  thickness approx. 80 μm
  Composition of compound as percentage by weight:
  PEI:MCP 220:copper fibers=25:30:45

| Specific volume resistance: | $9.3 \times 10^{-4}$ Ω cm |
|---|---|
| Specific conductivity: | $1.1 \times 10^3$ 1/(Ω cm) |

Specific volume resistances which lie in the order of magnitude of pure metallic conductors are achieved by the described compounds. As a result of the simultaneous high fusibility of the compounds, this opens up an innovative application spectrum in areas including micro injection molding, 2-component injection molding, mechatronics, contacting and component assembly. Printed conductors for example can thus be integrated directly into a component in the 2-component injection molding process, which for example with regard to the manufacture of 3D-MID devices opens totally new perspectives. Furthermore, the contacting can be integrated directly on the device by means of a direct cable overmolding, for example. In this case, the cable contacting by means of a screwing, clamping or soldering process is dispensed with. It is also possible to integrate contact pins on the device by way of the injection molding process. New possibilities also present themselves for the assembly of components (diodes, capacitors, chips etc.) on printed circuit boards and printed conductors. Since the new compounds have a high proportion of a low melting-point metal compound, it is easier to mount the components, for example by directly soldering contacts with solder or by preheating the pins and simply pressing them in or by spot heating (using a laser for example) the printed conductors in the assembly area and then mounting the components.

The new compounds are also of interest for components and devices where there is a requirement for a high level of electromagnetic screening. On the one hand, the screening effect is permanently secured by the aforementioned "fusion" of the metal fibers even in the case of stress due to temperature change which is a major problem with regard to the compounds available today. On the other hand, it can be realized by the injection molding method during device manufacture, in other words retrofitting of screening plates for example is not required. A further problem affecting screening housings made from commercially available compounds is the poor contact capability of the housings caused by the low electrical conductivity. Simple and above all reliable contacting can be implemented as a result of the extremely high electrical conductivity of the new compounds.

As a result of the high thermal conductivity and the opportunities for variation in shaping, the new hybrids can also be used in the context of heat dissipation.

Applications are possible in electronics, electrical engineering, in electromagnetic devices, for heat dissipation etc. The hybrid can be used in the case of printed conductors, contact pins, thermal fuses, cable contacts, EMS etc. for example.

The invention relates to a metal/plastic hybrid and to a shaped body produced therefrom. By combining metallic additives in plastic it has been shown for the first time that specific volume resistances of less than $10^{-2}$ Ωcm can be realized while simultaneously achieving good processability of the compounds during the injection molding process. Furthermore, other shaping processes such as extrusion, deep-drawing etc. can also be used for the compounds.

With the aid of the invention it is possible for the first time to manufacture thermoplastic compounds which have a specific volume resistance of less than $10^{-2}$ Ωcm and can be processed using the injection molding process. The invention also allows applications such as injection molded printed conductors and/or contact pins and/or cable contacts to be realized for the first time by direct overmolding etc. using these compounds.

The invention claimed is:

1. A metal/plastic hybrid which comprises:
   a thermoplastic in a proportion of 10% to 25% by weight,
   a metal compound melting in the range between 100° C. and 400° C. the metal compound consisting essentially of a metal selected from the group consisting of bismuth, zinc, tin and mixtures thereof, and
   an electrically conducting and/or metallic filler in the form of a copper fiber in a proportion of at least 30% by weight to 70% by weight, and is present jointly with the metal compound melting in the range between 100° C. and 400° C. in the hybrid as a fiber network, wherein,
   a total proportion of (i) the metal compound melting in the range between 100° C. and 400° C. and (ii) the copper fiber is ≧60% by weight, and
   the length of the copper fibers lies between 1 and 10 mm, the thickness is <100 μm.

2. The metal/plastic hybrid according to claim 1, which has a specific volume resistance of less than $10^{-2}$ Ωcm and/or a thermal conductivity of >5 W/mK.

3. A shaped body, produced by a plastic shaping process, and which is at least in part manufactured from a metal/plastic hybrid comprising a thermoplastic in a proportion of 10% to 25% by weight, a metal compound melting in the range between 100° C. and 400° C., the metal compound consisting essentially of a metal selected from the group consisting of bismuth, zinc, tin and mixtures thereof, and an electrically conducting and/or metallic filler in the form of a copper fiber in a proportion of at least 30% by weight to 70% by weight, wherein a total proportion of (i) the metal compound melting in the range between 100° C. and 400° C. and (ii) the copper fiber is ≧60% by weight.

4. The metal/plastic hybrid according to claim 3, which has a specific volume resistance of less than $10^{-2}$ Ωcm and/or a thermal conductivity of >5 W/mK.

5. A metal/plastic hybrid, comprising:
   a thermoplastic in a proportion of 10% to 25% by weight;
   a lead-free metal compound melting in the range between 100° C. and 400° C., the lead-free metal compound consists essentially of a metal; and
   an electrically conducting and/or metallic filler in the form of a copper fiber in a proportion between 30% by weight and 70% by weight, wherein,
   the copper fiber is fused with the lead-free metal compound to provide a fiber network, and
   a total proportion of (i) the metal compound melting in the range between 100° C. and 400° C. and (ii) the copper fiber is ≧60% by weight.

6. The metal/plastic hybrid according to claim 5, wherein the metal of the lead-free metal compound is selected from the group consisting of bismuth, zinc, tin and combinations thereof.

7. The metal/plastic hybrid according to claim 5, which has a specific volume resistance of less than $10^{-2}$ Ωcm and/or a thermal conductivity of >5 W/mK.

* * * * *